(12) United States Patent
Yoon et al.

(10) Patent No.: US 6,546,165 B2
(45) Date of Patent: Apr. 8, 2003

(54) OPTICAL MULTIPLEXING/DEMULTIPLEXING MODULE

(75) Inventors: Daeyoul Yoon, Tokyo (JP); Hiroshi Matsuura, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/912,765

(22) Filed: Jul. 25, 2001

(65) Prior Publication Data
US 2002/0044732 A1 Apr. 18, 2002

(30) Foreign Application Priority Data

Jul. 26, 2000 (JP) ...................... 2000-225533
Sep. 14, 2000 (JP) ...................... 2000-279983

(51) Int. Cl.[7] .............. G02B 6/28; G02B 6/27; G02B 5/30
(52) U.S. Cl. .............. 385/24; 385/11; 385/36; 359/122; 359/129; 359/494
(58) Field of Search .................. 385/11, 24, 36; 359/122, 129, 494

(56) References Cited

U.S. PATENT DOCUMENTS

| 4,744,075 | A | * | 5/1988 | Buhrer | 359/133 |
| 4,805,977 | A | | 2/1989 | Tamura et al. | 385/47 |
| 5,682,446 | A | * | 10/1997 | Pan et al. | 385/11 |
| 5,689,593 | A | * | 11/1997 | Pan et al. | 385/11 |
| 5,818,981 | A | * | 10/1998 | Pan et al. | 385/11 |
| 6,038,597 | A | | 3/2000 | Pan | 385/24 |
| 6,243,200 | B1 | * | 6/2001 | Zhou et al. | 359/497 |
| 6,295,393 | B1 | * | 9/2001 | Naganuma | 385/11 |
| 6,377,720 | B1 | * | 4/2002 | Kokklink | 385/11 |

FOREIGN PATENT DOCUMENTS

| JP | 06148459 A | 5/1994 | G02B/6/28 |
| JP | 06310783 A | 11/1994 | G02B/6/28 |
| JP | 11186639 A | 7/1999 | H01S/3/094 |

* cited by examiner

Primary Examiner—Brian Healy
Assistant Examiner—Kevin S Wood
(74) Attorney, Agent, or Firm—Knobbe, Martens, Olson & Bear LLP

(57) ABSTRACT

An optical multiplexing/demultiplexing module for inputting a first linearly polarized beam after exiting a first optical waveguide, and the first beam is collimated by a first lens. A second linearly polarized beam exits a second optical waveguide and is collimated by a second lens. Both beams enter an entrance surface of a uniaxial birefringent crystal. The second beam enters the crystal along an optical path which is changed by a prism. This reduces the distance between the respective points of entrance of the beams. The beams which have entered the crystal are multiplexed at an exit surface of the crystal. A resultant multiplexed beam is converged by a third lens to enter and exit a third optical waveguide.

18 Claims, 8 Drawing Sheets

OPTICAL MULTIPLEXING/DEMULTIPLEXING MODULE

FIELD OF THE INVENTION

The present invention relates to an optical multiplexing/demultiplexing module having a function of synthesizing polarized waves and a function of demultiplexing a wave into polarized waves.

BACKGROUND OF THE INVENTION

Recently, optical multiplexing/demultiplexing modules are widely used in optical communication systems and in the field of optical measurement and the like. In general, an optical multiplexing/demultiplexing module functions as an optical multiplexer and as an optical demultilexer. Optical multiplexing/demultiplexing modules include optical multiplexers based on a method in which a plurality of incident beams having different wavelengths are multiplexed (or synthesized) to emit and obtain a multiplexed beam. By using such an optical multiplexing/demultiplexing module based on the wavelength multiplex/demultiplex method, a plurality of lights having different wavelengths can be transmitted as a multiplexed signal beam. Further, when the optical multiplexing/demultiplexing module is used as an optical demultiplexer, a multiplexed signal beam is demultiplexed into signal beams having different wavelengths.

Optical multiplexing/demultiplexing modules include optical multiplexers based on a method in which two linearly polarized incident beams having planes of polarization orthogonal to each other are multiplexed to emit and obtain a single multiplexed beam and in which the multiplexed beam is demultiplexed into two linearly polarized waves. An optical multiplexing/demultiplexing module based on the linearly polarized beam multiplexing/demultiplexing method is also referred to as "polarized beam combiner/splitter. For example, an optical multiplexing/demultiplexing module based on the linearly polarized beam multiplexing/demultiplexing method is used for synthesizing laser beams from a semiconductor laser or the like to provide higher optical power, as described later.

The plane of polarization implies a plane having a direction in which a linearly polarized beam is propagated and a direction in which an electric vector (electric field) oscillates.

Although the semiconductor lasers are widely used as light sources in the field of optical communication, it is presently difficult to provide a semiconductor laser having high power that can satisfy requirements in the field. Further, it is known that when a semiconductor laser oscillates laser beams that are linearly polarized beams, improved laser beam optical power can be achieved by synthesizing two laser beams having planes of polarization orthogonal to each other.

Conventional optical multiplexing/demultiplexing modules based on the linearly polarized beam multiplexing/demultiplexing method include devices utilizing a uniaxial birefringent crystal and devices utilizing a polarization beam splitter.

FIG. 6 is an illustration of an example of an optical multiplexing/demultiplexing module based on the linearly polarized beam multiplexing/demultiplexing method. The optical multiplexing/demultiplexing module is an example of an optical multiplexing/demultiplexing module in which a uniaxial birefringent crystal is used to multiplex linearly polarized beams having planes of polarization orthogonal to each other. In FIG. 6, a uniaxial birefringent crystal 78 multiplexes a first linearly polarized beam 71 which is emitted by a first polarization-maintaining optical fiber 70 and collimated by a first lens 72 and a second linearly polarized beam 73 which is emitted by a second polarization-maintaining optical fiber 74 and collimated by a second lens 76.

As shown in FIG. 6, the polarization-maintaining optical fibers 70 and 74 are provided substantially in parallel with each other at an interval, and the first linearly polarized beam 71 and second linearly polarized beam 73 enter the uniaxial birefringent crystal 78 with their optical axes substantially in parallel with each other. When the first linearly polarized beam 71 and second linearly polarized beam 73 enter an entrance surface 77 of the uniaxial birefringent crystal 78, the linearly polarized beams 71 and 73 are multiplexed at an exit surface 79 of the uniaxial birefringent crystal 78. The multiplexed beam 75 is converged by a lens 80 to enter an optical fiber 82.

SUMMARY OF THE INVENTION

An optical multiplexing/demultiplexing module according to the invention comprises:

a first optical input section for inputting a first linearly polarized beam;

a second optical input section provided at an interval from the first optical input section for inputting a second linearly polarized beam having a plane of polarization orthogonal to that of the first linearly polarized beam;

a uniaxial birefringent crystal for multiplexing the first linearly polarized beam and the second linearly polarized beam:

an optical output section for outputting a multiplexed beam multiplexed by the uniaxial birefringent crystal; and an optical path converting member for converting at least either of the optical path of the first linearly polarized light propagating from the first input section and the optical path of the second linearly polarized beam propagating from the second input section when they enter the uniaxial birefringent crystal, wherein the optical path converting member performs the optical path conversion such that the distance between the points of entrance of the first linearly polarized beam and second linearly polarized beam entering the entrance surface of the uniaxial birefringent crystal becomes smaller than the distance between the first optical input section and second optical input section.

BRIEF DESCRIPTION OF THE DRAWINGS

Exemplary embodiments of the invention will now be described in conjunction with drawings, in which.

DETAILED DESCRIPTION

Figure 1:
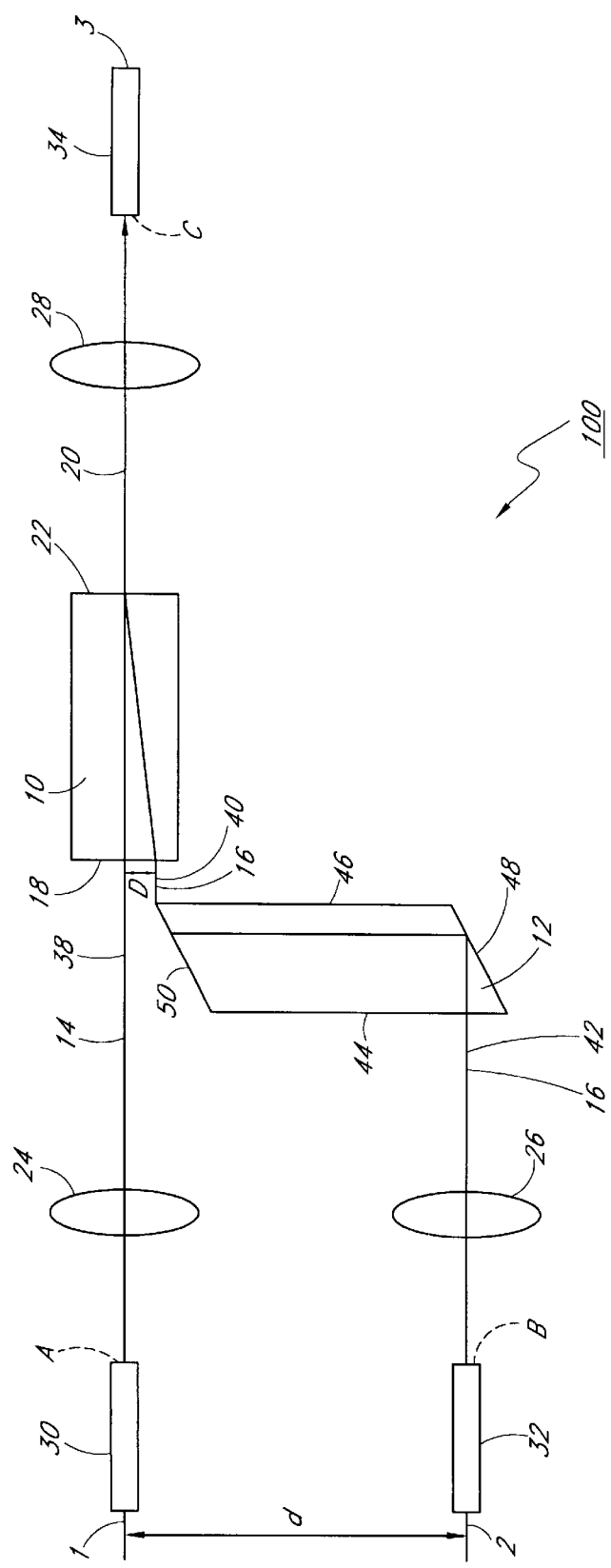
FIG. 1 is a schematic view of a configuration of one embodiment of an optical multiplexing/demultiplexing module according to the invention.

Specific embodiments of the invention will now be described with reference to the drawings. The size and configuration of each component and the positional relationship between the components in the drawings are only shown schematically to allow understanding of the invention, and the numerical conditions described below are merely shown as examples. In the following description, the description of the optical multiplexing/demultiplexing module shown in FIG. 6 will be omitted or simplified to avoid repetition.

FIG. 1 is a configuration diagram schematically showing one embodiment of an optical multiplexing/demultiplexing module according to the invention. An optical multiplexing/demultiplexing module 100 of an embodiment of the invention shown in FIG. 1 has a first optical input section 1 for inputting a first linearly polarized beam 14, a second optical input section 2 provided at an interval from the first optical input section 1 for inputting a second linearly polarized beam 16 having a plane of polarization orthogonal to that of the first linearly polarized beam 14, a uniaxial birefringent crystal 10 for multiplexing the first linearly polarized beam 14 and the second linearly polarized beam 16, an optical output section 3 for outputting a multiplexed beam 20 multiplexed by the uniaxial birefringent crystal 10, and an optical path converting member 12 for converting the optical path of the second linearly polarized beam 16 input through the second input section 2 when it enters the uniaxial birefringent crystal 10.

The above-mentioned optical path is a path in which light is propagated and which is normally extends along an optical axis. The term "optical path" means a line connecting centers of sections of light having a beam width taken in a direction orthogonal to the direction in which the light is propagated. "A change of an optical path" means a change of the propagating direction caused by deflecting the optical path utilizing, for example, reflection or refraction of light or the like, or it means parallel translation of the optical path as a result of deflection of the same.

The uniaxial birefringent crystal 10 has an entrance surface 18 through which the first linearly polarized beam 14 and second linearly polarized beam 16 enter and an exit surface 22 from which the multiplexed beam 20 obtained by multiplexing the first linearly polarized beam 14 and second linearly polarized beam 16 exit.

The optical path converting member 12 converts the optical path of the second linearly polarized beam 16 such that the distance (separation width D) between the point of entrance of the first linearly polarized beam 14 and the point of entrance of the second polarized beam 16 which enter the entrance surface 18 of the uniaxial birefringent crystal 10 becomes smaller than the distance d between the first optical input section 1 and second optical input section 2. The point of incidence of the first linearly polarized wave 14 upon the uniaxial birefringent crystal 10 is an intersection between the optical axis of the first linearly polarized beam 14 and the entrance surface 18 of the uniaxial birefringent crystal 10. The point of incidence of the second linearly polarized wave 16 upon the uniaxial birefringent crystal 10 is an intersection between the optical axis of the second linearly polarized beam 16 and the entrance surface 18.

Figure 3:
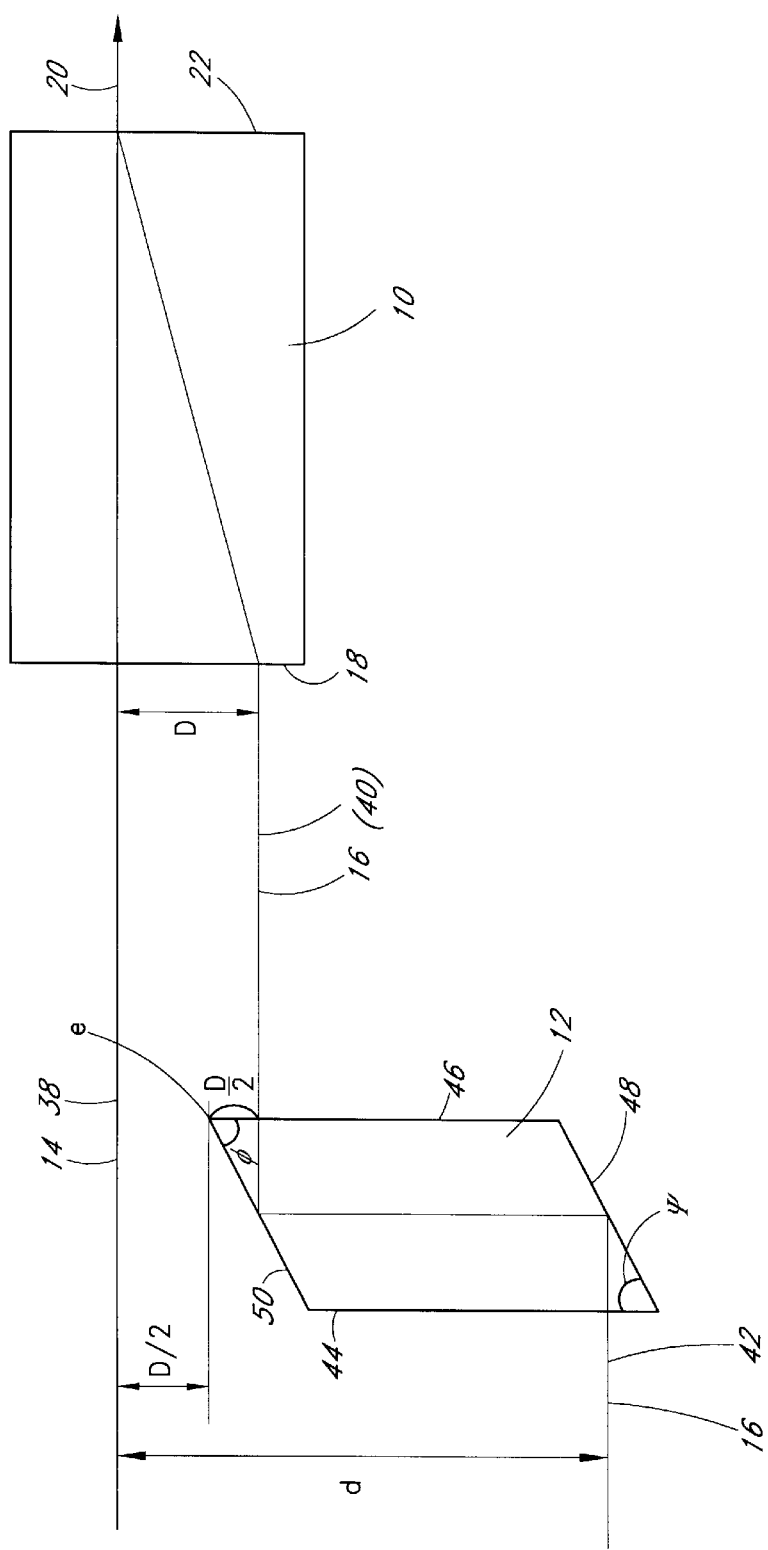
FIG. 3 is an illustration showing a positional relationship between the uniaxial birefringent crystal of the optical multiplexing/demultiplexing module shown in FIG. 1 and a prism.

While there is no particular limitation on the configuration of the optical path converting member 12, the optical path converting member 12 in the embodiment is constituted by a prism fabricated from glass or the like. The optical path converting member 12 has a pallalelogrammatic sectional configuration. As shown in FIG. 3, the optical path converting member 12 has an entrance surface 44 and an exit surface 46 which are in parallel with each other, a first reflecting surface 48 on which light incident upon the entrance surface 44 is first reflected, and a second reflecting surface 50 which faces the first reflecting surface 48 with a gap between them and which is in parallel with the first reflecting surface 48. In the embodiment, the entrance surface 44 and the first reflecting surface 48 of the optical path converting member 12 are adjacent to each other, while the second reflecting surface 50 and the exit surface 46 are adjacent to each other.

The second linearly polarized beam 16 is reflected by the first reflecting surface 48 after entering the entrance surface 44 of the optical path converting member 12 and is thereafter reflected by the second reflecting surface 50 to exit from the exit surface 46. A design is adopted in which the propagating direction of the beam exiting the optical path converting member 12 is in parallel with the propagating direction of the beam entering the optical path converting member 12.

As shown in FIG. 1, the optical multiplexing/demultiplexing module 100 has a first optical waveguide 30, a second optical waveguide 32, and a third optical waveguide 34. The first optical waveguide 30 is optically coupled to the first optical input section 1, and the second optical waveguide 32 is connected to the second optical input section 2. The third optical waveguide 34 is connected to the optical output section 3. The first and second optical waveguides 30 and 32 respectively propagate the first linearly polarized beam 14 and second linearly polarized beam 15 emitted by a light source (not shown) and thereafter cause them to exit toward a first lens 24 and a second lens 26, respectively. The multiplexed beam 20 enters the third optical waveguide 34 to be propagated therein.

In the optical multiplexing/demultiplexing module 100, polarization-maintaining optical fibers are used as the first and second optical waveguides 30 and 32, a single mode fiber or polarization-maintaining optical fiber is used as the third optical waveguide 34. There is no particular limitation on the configurations of the first, second and third optical waveguides 30, 32, and 34, and they may be arbitrarily set.

The first lens 24 is a lens which converts the first linearly polarized beam 14 into a parallel beam. The second lens 26 is a lens which converts the second linearly polarized beam 16 into a parallel beam. The first and second lenses 24 and 26 are collimator lenses. A third lens 28 is a converging lens for condensing the multiplexed beam 20 from the uniaxial birefringent crystal 10.

For example, the above-mentioned parallel beam is a beam which has substantially equal beam sectional areas in planes orthogonal to the optical axis thereof along which the beam is propagated.

When the first and second optical waveguides 30 and 32 are optical fibers as described above, beams exiting the first and second optical wavegudies 30 and 32 will be divergent beams. In order to multiplex the beams exiting the optical fibers, the beams exiting the optical fibers are converted into parallel beams. Thus, the first and second optical waveguides 30 and 32 are constituted by optical fibers, and beams exiting those optical fibers are converted into parallel beams by the first and second lenses 24 and 26, respectively.

When the third optical waveguide 34 is an optical fiber, in order to cause the multiplexed parallel beam to enter an end face or an entrance surface of the optical fiber, the parallel beam must be converted into a convergent beam. For this reason, the multiplexed parallel beam is converted into a convergent beam by the third lens 28. The multiplexed beam 20 can be efficiently caused to enter the core of the third optical waveguide 34 by providing the third lens 28 to converge the multiplexed beam 20.

There is no particular limitation on the configuration of each of the first, second, and third lenses 24, 26, and 28. Preferably, an optical element selected from among a group of optical elements consisting of a ball lens, a graded index (GRIN) lens, an aspherical lens and a multi-mode graded fiber lens (MMFL) may be used as each of the first, second, and third lenses 24, 26, and 28. When lenses as described above are used as the first and second lenses 24 and 26, those lenses serve as collimator lenses. When a lens as described above is used as the third lens 28, the lens serves as a converging lens.

Thus, by using the first, second, and third lenses 24, 26, and 28 in a preferable manner, a beam which has entered the optical multiplexing/demultiplexing module can be output through the first, second, and third optical waveguides 30, 32, and 34 with a small loss. It is not essential that the first, second, and third lenses 24, 26, and 28 are lenses identical to each other. The lenses used maybe different from or identical to each other.

A description will now be made on an arrangement of the above-described components in the optical multiplexing/demultiplexing module 100. The optical multiplexing/demultiplexing module 100 has a first optical system and a second optical system as described below. The first optical system is constituted by the first optical waveguide 30, the first lens 24, the uniaxial birefringent crystal 10, the third lens 28, and the third optical waveguide 34. The second optical system is constituted by the second optical waveguide 32, the second lens 26, the optical path converting member 12, the uniaxial birefringent crystal 10, the third lens 28, and the third optical waveguide 34. The optical path of the first linearly polarized beam 14 is defined along the optical axis of the first optical system. The optical path of the second linearly polarized beam 16 is defined along the optical axis of the second optical system. In the example of a configuration shown in FIG. 1, the optical axis of the first optical system and the optical path along the same are identical to the optical axis of the second optical system and the optical path along the same in the region between the exit surface 22 of the uniaxial birefringent crystal 10 and the third optical waveguide 34.

In a function of the optical multiplexing/demultiplexing module 100 as an optical multiplexer, the components of the optical multiplexing/demultiplexing module are arranged so as to propagate the first linearly polarized beam 14 exiting the first optical waveguide 30 and the second linearly polarized beam 16 exiting the second optical waveguide 32 as described below.

The first linearly polarized beam 14 exits from the first optical waveguide 30 and it is converted by the first lens 24 into a parallel beam which thereafter enters the entrance surface 18 of the uniaxial birefringent crystal 10. The first linearly polarized beam 14 travels through the uniaxial birefringent crystal 10 to exit from the exit surface 22 thereof, and it is thereafter converged by the third lens 28 and to enter the third optical waveguide 34 and to be propagated therein.

The second linearly polarized beam 16 exits from the second optical waveguide 32 after being propagated therein, and it is converted by the second lens 26 into a parallel beam which thereafter enters the entrance surface 44 of the optical path converting member 12. The second linearly polarized beam 16 travels through the optical path converting member 12 to exit from the exit surface 46 thereof, and it thereafter enters the entrance surface 18 of the uniaxial birefringent crystal 10. The distance (separation width D) between the point of incidence of the second polarized beam 16 upon the entrance surface 18 and the point of incidence of the first linearly polarized beam 14 upon the entrance surface 18 is very much smaller than the distance d between the first optical input section 1 and second optical input section 2 as previously described.

The second linearly polarized beam 16 which has entered the uniaxial birefrindent crystal 10 travels through the uniaxial birefringent crystal 10, and it is multiplexed with the first linearly polarized beam 14 at the exit surface 22 thereof to exit from the exit surface 22. After exiting the uniaxial birefringent crystal 10, the second linearly polarized beam 16 is propagated on the same optical axis as that of the first linearly polarized beam 14 converged by the third lens 28 to enter the third optical waveguide 34 and to be propagated therein. That is, the first linearly polarized beam 14 and second linearly polarized beam 16 are propagated as a multiplexed beam 20 after exiting the exit surface 22 of the uniaxial birefringent crystal 10.

As described above, in the optical multiplexing/demultiplexing module 100, the optical path converting member 12 is provided such that the distance (separation width D) between the point of incidence of the second polarized beam 16 upon the entrance surface 18 and the point of incidence of the first linearly polarized beam 14 upon the entrance surface 18 becomes smaller than the distance d between the first optical input section 1 and second optical input section 2.

In the optical multiplexing/demultiplexing module 100, the first linearly polarized beam 14 and second linearly polarized beam 16 are multiplexed and demultiplexed by the uniaxial birefringent crystal 10. That is, no organic adhesive is used in the optical path thereof unlike using a polarization beam splitter. Therefore, the optical multiplexing/demultiplexing module 100 is free from problems resulting from the use of an organic adhesive in the optical path thereof. The optical multiplexing/demultiplexing module 100 is advantageous in that it can accommodate beams with high power and in that stable characteristics can be maintained against changes in the environment.

Figure 2:
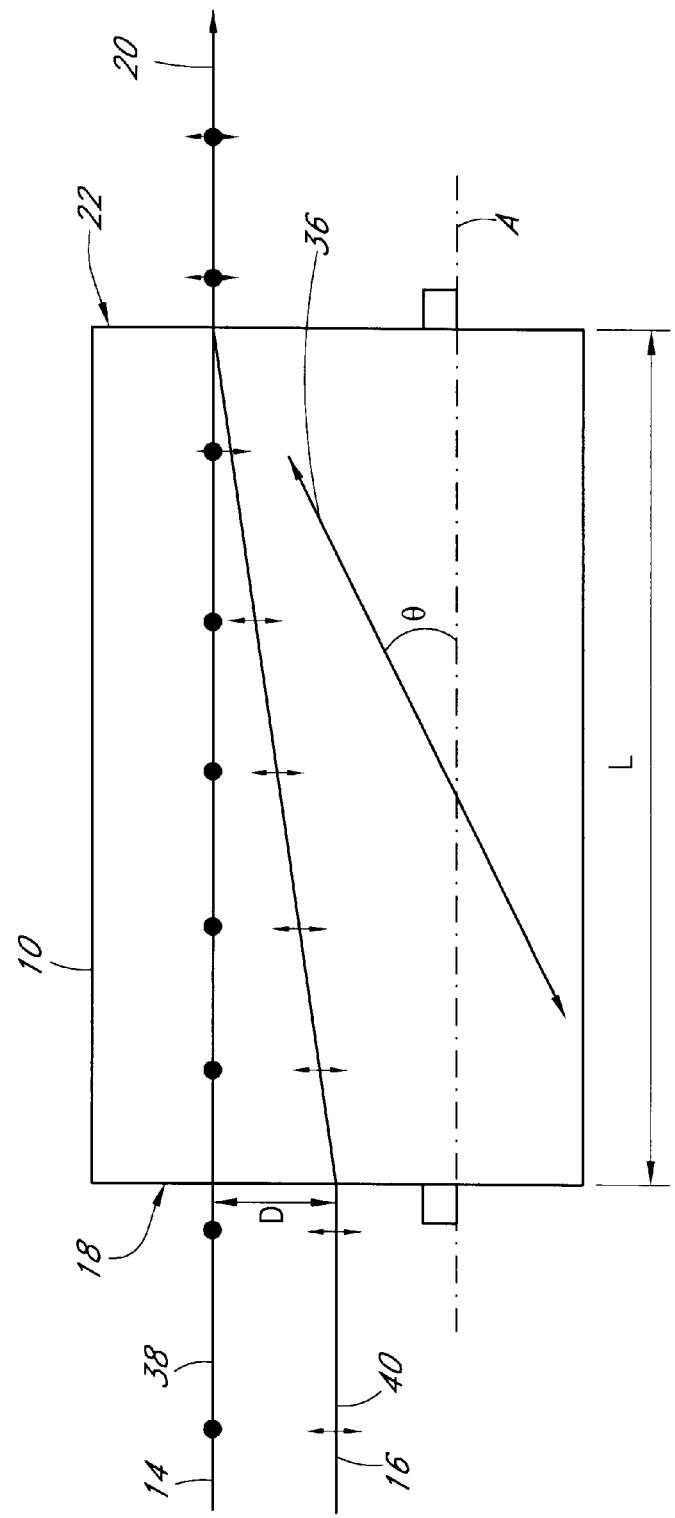
FIG. 2 is an illustration showing a structure of a uniaxial birefringent crystal of the optical multiplexing/demultiplexing module shown in FIG. 1 and showing states of propagation of beams in the same.

A detailed description will now be made with reference to FIGS. 1 and 2 on considerations to be paid (conditions to be considered) for the uniaxial birefringent crystal 10 and optical path converting member 12 for preferable propagation of beams in the embodiment. FIG. 2 is an illustration showing a structure of the uniaxial birefringent crystal 10 of the optical multiplexing/demultiplexing module 100 and showing states of propagation of beams in the same.

A first condition is a need for making the optical axis 38 of the first linearly polarized beam 14 and the optical axis 40 of the second linearly polarized beam 16 parallel with each other in the vicinity of the entrance surface 18 of the uniaxial birefringent crystal 10. Specifically, a design is adopted in which the first linearly polarized beam 14 and second linearly polarized beam 16 enter the uniaxial birefringent crystal 10 with the optical axis 38 of the first linearly polarized beam 14 and the optical axis 40 of the second linearly polarized beam 16 maintaining in parallel with each other.

Since a prism having a parallelogrammatic sectional configuration is used as the optical path converting member 12, an optical axis 42 of the second linearly polarized beam 16 before entering the optical path converting member 12 is in parallel with the optical axis 40 of the second linearly polarized beam 16 after exiting the optical path converting member 12. Therefore the optical axes 38, 40, and 42 are in parallel with each other (see FIG. 1). The optical axis 42 of the propagation of the linearly polarized beam 16 before entering the optical path converting member 12 may not be in parallel with the optical axes 38 and 40 depending on the configuration of optical path converting member 12 used, although no problem arises in such a situation.

A second condition is a need for making the entrance surface 18 and exit surface 22 of the uniaxial birefringent crystal 10 parallel with each other.

A third condition is a need for locating a crystal axis 36 of the uniaxial birefringent crystal 10 on a plane including the optical axes 38 and 40 along which the first and second linearly polarized beams 14 and 16 incident upon the entrance surface 18 are respectively propagated (hereinafter also referred to as "plane A"). That is, the optical axes 38 and 40 and the crystal axis 36 are to be located on the same plane.

A fourth condition is a need for arranging the components such that the plane of polarization of either of the first linearly polarized beam 14 and second linearly polarized beam 16 is parallel to the plane A and such that the other is in parallel with the same. In one embodiment, as shown in FIG. 2, an arrangement is adopted in which the plane of polarization of the first linearly polarized beam 14 is in orthogonal with the plane A and in which the plane of polarization of the second linearly polarized beam 16 is parallel to the plane A.

In FIG. 2, the dots on the path of propagation of the first linearly polarized beam 14 indicate the direction in which the electric vector of the first linearly polarized beam 14 oscillates. In this case, since the electric vector of the first linearly polarized beam 14 oscillates in a direction perpendicular to the plane of the drawing, the plane of polarization of the first linearly polarized beam 14 is in orthogonal with the plane A as described above. The arrows on the path of propagation of the second linearly polarized beat 16 indicate the direction in which the electric vector of the second linearly polarized beam 16 oscillates. In this case, since the electric vector of the second linearly polarized beam 16 oscillates in a direction in parallel with the plane of the drawing, the plane of polarization of the second linearly polarized beam 16 is parallel to the plane A as described above.

A fifth condition is a need for causing the first linearly polarized beam 14 and the second linearly polarized beam 16 to perpendicularly enter the entrance surface 18 of the uniaxial birefringent crystal 10.

A sixth condition is a need for satisfying Equation 1 shown below with values of D, L, Θ, $n_o$, and $n_e$ to be described later.

$$D = L \cdot [\{(n_o^2 - n_e^2) \cdot \tan \Theta\} / \{n_e^2 + n_o^2 \cdot \tan^2 \Theta\}] \quad \text{Equation 1}$$

where D represents the above-described separation width; L represents the distance between the entrance surface 18 and exit surface 22 of the uniaxial birefringent crystal 10; and Θ represents an angle defined by a straight line perpendicular to the entrance surface 16 and exit surface 22 of the uniaxial birefringent crystal 10 (which is represented by alternate long and short dash lines in FIG. 2) and the crystal axis 36. Further, $n_o$ represents a refractive index of the uniaxial birefringent crystal 10 for an ordinary ray, and $n_e$ represents a refractive index of the uniaxial birefringent crystal 10 for an extraordinary ray.

Since the plane of polarization of the first linearly polarized beam 14 is in orthogonal with the plane A as described above, the first linearly polarized beam 14 is an ordinary ray for the uniaxial birefringent crystal 10. Since the plane of polarization of the second linearly polarized beam 16 is parallel to the plane A, the second linearly polarized beam 16 is an extraordinary ray for the uniaxial birefringent crystal 10. Equation 1 proves that the uniaxial birefringent crystal 10 of the optical multiplexing/demultiplexing module 100 can be made small by reducing the separation width D as described above to reduce the crystal length L of the uniaxial birefringent crystal 10.

When the optical multiplexing/demultiplexing module 100 satisfies the first through sixth conditions, it can be easily designed and preferably used as an optical multiplexing/demultiplexing module having a function of multiplexing a first linearly polarized beam 14 and a second linearly polarized beam 16 and having the above-described advantages. However, those conditions are merely examples of preferable conditions for the designing of an optical multiplexing/demultiplexing module 100. Therefore, an optical multiplexing/demultiplexing module 100 having a configuration as shown in FIG. 1 can be provided as a compact optical multiplexing/demultiplexing module having the function of multiplexing a first linearly polarized beam 14 and a second linearly polarized beam 16 even if it does not satisfy those conditions. In this case, the optical multiplexing/demultiplexing module 100 having a configuration as shown in FIG. 1 can be used as one of optical multiplexing/demultiplexing modules according to the invention.

A detailed description will now be made with reference to FIGS. 2 and 3 on preferable materials and designs of the uniaxial birefringent crystal 10 and optical path converting member 12 which are important elements of the invention and on a positional relationship between them. FIG. 3 is an illustration showing a positional relationship between the uniaxial birefringent crystal 10 and the optical path converting member 12.

When the uniaxial birefringent crystal 10 satisfies Equation 1, the uniaxial birefringent crystal 10 has constant refractive indices $n_o$ and $n_e$ as long as it is formed from the same material. The relationship between the separation width D and the crystal length L depends on the angle Θ (radian). When the angle Θ satisfies Equation 2 shown below, the separation width D is at a maximum value with the crystal length L kept unchanged. In other words, when the angle Θ satisfies Equation 2, the crystal length L is at a minimum with the separation width D kept unchanged. Therefore, the uniaxial birefringent crystal 10 can be made small with the separation width D kept unchanged by designing it such that the angle Θ satisfies Equation 2. As a result, the optical multiplexing/demultiplexing module can be fabricated at a low cost.

$$\Theta = \tan^{-1}(n_e/n_o) \quad \text{Equation 2}$$

When the angle Θ satisfies Equation 2, it is apparent from Equations 1 and 2 that the separation width D satisfies Equation 3 shown below in its relationship with the crystal length L.

$$D = (\tfrac{1}{2}) \cdot L \cdot \{(n_o^2 - n_e^2)/(n_e \cdot n_o)\} \qquad \text{Equation 3}$$

As apparent from Equation 3, the separation width D depends on the refractive indices $n_o$ and $n_e$ in addition to the crystal length L. Therefore, the refractive indices $n_o$ and $n_e$ must be considered in order to reduce the crystal length L with the separation width D kept unchanged.

Preferably, a material that increases the value of the term including $n_o$ and $n_e$ on the right side of Equation 3 is chosen as the material of the uniaxial birefringent crystal 10 because it will allow the separation width D per unit crystal length L to be increased. From such a point of view, materials suitable for uniaxial birefringent crystal 10 are rutile, calcite, lithium niobate, lithium tantalate, $YVO_4$, quartz, $LiB_3O_5$ (LBO), $BaB_2O_4$ (BBO), and so on.

The uniaxial birefringent crystal 10 is subjected to less variation of characteristics attributable to changes in the environment when it is formed from such a material. Changes in the environment include changes in the humidity, temperature, atmospheric pressure, and so on. For example, variation of characteristics includes changes in the refractive indices.

When the uniaxial birefringent crystal 10 is formed from one of the above-described materials, it has small losses in frequency ranges used for optical communication and frequency ranges of light sources for exciting an erbium doped optical fiber amplifier (hereinafter referred to as "EDFA"), which makes it possible to handle beams with high optical power. For example wavelengths used for optical communication include 1.3 μm and 1.55 μm, and wavelengths of light sources for exciting an EDFA include 0.98 μm and 1.48 μm. The small losses in this context are attributable to small amounts of light absorption.

Therefore, when there are small losses in those frequency ranges, it means that there are small amounts of light absorption in those frequency ranges in the uniaxial birefringent crystal 10 itself. From those points of view, the above-described materials such as rutile are preferably used for forming the uniaxial birefringent crystal 10. The above-described configuration of the uniaxial birefringent crystal 10 is merely a preferred embodiment, and the invention is not limited to the same configuration.

The optical path converting member 12 shown in FIG. 3 has a parallelogrammatic sectional configuration as described above, and it is constituted by a prism having an entrance surface 44 and an exit surface 46 in parallel with each other and a first reflecting surface 48 and a second reflecting surface 50 in parallel with each other as described above.

When the optical path converting member 12 is formed as described above, the second linearly polarized beam 16 is sequentially reflected by the first reflecting surface 48 and second reflecting surface 50 after entering the entrance surface 44 of the optical path converting member 12, and it thereafter exits the exit surface 46 of the optical path converting member 12. Since the propagating direction of a beam entering the optical path converting member 12 and the propagating direction of a beam exiting the same are in parallel with each other, the optical path converting member 12 can easily cause parallel translation of the optical path of the second polarized beam 16.

As shown in FIG. 3, since the exit surface 46 of the optical path converting member 12 faces the entrance surface 18 of the uniaxial birefringent crystal 10, the second linearly polarized beam 16 which has been subjected to parallel translation by the optical path converting member 12 can be caused to enter the entrance surface 18 of the uniaxial birefringent crystal 10.

By using and arranging the optical path converting member 12 having the above-described configuration, the distance between the optical axis 38 of the first linearly polarized beam 14 and the optical axis 40 of the second linearly polarized beam 16 can be made small by converting the optical path of the second linearly polarized beam 16 with the optical path converting member 12 even if there is a great distance d between the optical paths of the propagation of the first linearly polarized beam 14 and second linearly polarized beam 16 in the region where the lenses 24 and 26 (see FIG. 1) are disposed. That is, while the separation width D between the first linearly polarized beam 71 and second linearly polarized beam 73 entering the uniaxial birefringent crystal 78 in FIG. 6 can not be made smaller than the diameter of the lenses 72 and 76. The separation width D in the embodiment of an optical multiplexing/demultiplexing module shown in FIG. 1 can be made much smaller than that in FIG. 6.

The separation width D shown in FIG. 3 is determined such that the conditions described below are satisfied.

Each of the first linearly polarized beam 14 collimated by the first lens 24 (see FIG. 1) and the second linearly polarized beam 16 collimated by the second lens 26 (see FIG. 1) is a beam having a certain width. Therefore, if the optical axis 38 of the first linearly polarized beam 14 and the optical axis 40 of the second linearly polarized beam 16 are too close to each other, the first linearly polarized beam 14 and second linearly polarized beam 16 overlap each other, and those two incident beams can not be caused to enter the uniaxial birefringent crystal 10 in a state in which they are completely separated from each other.

In order to prevent any overlap between the first linearly polarized beam 14 and second linearly polarized beam 16 at the entrance surface 18 of the uniaxial birefringent crystal 10, the separation width D is determined as described below. A first condition for determining the separation width D is to form the separation width D in a size which is equal to or greater than the sum of twice the spot size of the first linearly polarized beam 16 on the entrance surface 18 of the uniaxial birefringent crystal 10 and twice the spot size of the second linearly polarized beam 16 on the same. That is, the separation width D is determined such that it satisfies $D \geq (2\omega_1 + 2\omega_2)$ where $\omega_1$ represents the spot size of the first linearly polarized beam 14 on the entrance surface 18 of the uniaxial birefringent crystal 10 (a first spot size) and $\omega_2$ represents the spot size of the second linearly polarized light 16 (a second spot size).

The term "spot size" means a distance from the optical axis of a beam where the magnitude of the electric field is 1/e of the value on the optical axis when measured in a sectional configuration of the beam which is taken in a plane orthogonal to the optical axis of the propagation of the beam and which is approximated by a Gaussian beam, a spot size being also called a beam radius. In this approximation, 99.9% or more of the entire power of the beam is present within a range at a distance from the optical axis which is equal to or smaller than twice the spot size. Therefore, the separation width D may be set such that it satisfies $D \geq (2\omega_1 + 2\omega_2)$ as described above in order to prevent the first linearly polarized beam 14 and second linearly polarized beam 16 from overlapping each other.

Since the first lens 24 is a lens which converts the first linearly polarized beam 14 into a parallel beam, the spot size of the first linearly polarized beam 14 is substantially constant in the region from the exit surface of the first lens 24 up to the entrance surface 18 of the uniaxial birefringent crystal 10. Similarly, since the second lens 26 is a lens which converts the second linearly polarized beam 16 into a parallel beam, the spot size of the second linearly polarized beam 16 exiting the exit surface of the second lens 26 is substantially equal to the spot size of the second linearly polarized beam 16 at the entrance surface 18 of the uniaxial birefringent crystal 10.

Therefore, when the separation width D is set to satisfy $D \geq (2\omega_1 + 2\omega_2)$, the first linearly polarized beam 14 and second linearly polarized beam 16 do not overlap each other before or when they enter the entrance surface 18 of the uniaxial birefringent crystal 10. Thus, by setting the separation width D such that $D \geq (2\omega_1 + 2\omega_2)$ is satisfied, the first linearly polarized beam 14 and second linearly polarized beam 16 can be stably multiplexed and demultiplexed with the uniaxial birefringent crystal 10 at low optical losses.

FIG. 3 shows an example in which the first spot size $\omega_1$ and the second spot size $\omega_2$ are equal to each other, and the value of them is represented ($\omega_1 = \omega_2 = \omega$). Therefore, the separation width D may be set at a value equal to or greater than $4\omega$.

In order to allow the first linearly polarized beam 14 to enter the entrance surface 18 of the uniaxial birefringent crystal 10 without being affected by the optical path converting member 12, it is necessary to prevent a prism edge e (see FIG. 3) from overlapping the first linearly polarized beam 14. The prism edge e is a part of the prism that is nearest to the first linearly polarized beam 14 which does not enter the optical path converting member 12, and it is a region where the exit surface 46 and the second reflecting surface 50 of the optical path converting member 12 intersect.

In order to prevent the prism edge e from overlapping the first linearly polarized beam 14 as described above, the optical path converting member 12 is located such that the prism edge e is at a distance of $2\omega_1$ or more from the optical axis 38 of the first linearly polarized beam 14. Further, the position of the optical path converting member 12 and the entrance position of the second linearly polarized beam 16 entering the optical path converting member 12 are determined such that the prism edge e is at a distance of $2\omega_2$ or more from the optical axis 40 of the second linearly polarized beam 16.

This arrangement constitutes a second condition for determining the separation width D. When a separation width D satisfies the second condition and when the optical axes 38 and 40 are in parallel with each other, the separation width D satisfies $D \geq (2\omega_1 + 2\omega_2)$ which is the first condition for determining a separation width D.

Since FIG. 3 shows an embodiment in which $\omega_1 = \omega_2 = \omega$, the prism edge e is located in the middle of the optical axis 38 of the first linearly polarized beam 14 and the optical axis 40 of the second linearly polarized beam 16. The prism edge e is located at a distance of $2\omega$ or more from each of the optical axes 38 and 40 (that is, $D/2 \geq 2\omega$ is satisfied). Thus, when the spot sizes of the first and second linearly polarized beams 14 and 16 are equal to each other, the prism edge e is preferably located at substantially equal distances from the optical axes 38 and 40.

For example, the prism edge e may have a rounded configuration instead of a pointed configuration as shown in FIG. 3. That is, the optical path converting member 12 may have a substantially parallelogrammatic sectional configuration. The second conditions applies not only when a prism having a parallelogrammatic sectional configuration as shown in FIG. 3 or a prism having a substantially parallelogrammatic sectional configuration is used as the optical path converting member 12 but also when a prism or reflecting mirror having a different configuration is used.

When a prism having a different configuration is used, the prism is also to be located such that a part of the prism nearest to the first linearly polarized beam 14 is at a distance of $2\omega_1$ or more from the optical axis 38 of the first linearly polarized beam 14. The position of the prism and the position of entrance of the second linearly polarized beam 16 entering the prism are determined such that the part of the prism nearest to the first linearly polarized beam 14 is at a distance of $2\omega_2$ or more from the optical axis 40 of the second linearly polarized beam 16. If it is difficult to take the second condition, reduction of losses may be achieved by adopting a configuration which satisfies at least the first condition.

Examples of the separation width D and spot size will now be described with reference to FIGS. 1 through 3. As described above, polarization-maintaining optical fibers are used as the first and second optical waveguides 30 and 32. Let us assume that $\omega_F$ represents the spot size of the first and second linearly polarized beams 14 and 16 immediately after their exit from the polarization-maintaining optical fibers. As described above, $\omega$ represents the spot size of the first linearly polarized beam 14 exiting the first lens 24 and the spot size of the second linearly polarized beam 16 exiting the second lens 26.

When the configurations of the beams exiting the first and second optical waveguides 30 and 32 are approximated by a Gaussian beam, the spot size $\omega$ after the exit from the lenses satisfies Equation 4 shown below where $\lambda$ represents the wavelength used and f represents the focal length of the lenses.

$$\omega = (\lambda \cdot f)/(\pi \cdot \omega_F) \qquad \text{Equation 4}$$

The spot size $\omega$ is about 170 μm when the spot size $\omega_F$ is 5 μm; the focal length of each of the lenses 24 and 26 is 1.8 mm; and the wavelength used is 1480 nm. As described above, both of the first linearly polarized beam 14 and second linearly polarized beam 16 are parallel beams after they exit the first lens 24 and second lens 26 respectively, and they have uniform spot sizes. Therefore, the first and second linearly polarized beams 14 and 16 has the spot size $\omega$ also on the entrance surface 18, the value of the spot size being about 170 μm.

In order that the first and second conditions for determining the separation width D are satisfied as described above, the separation width D may be set equal to or greater than $4\omega$ or 680 μm. The separation width D is set at 800 μm in FIG. 3. Further, since rutile is used as the uniaxial birefringent crystal 10, the refractive indices $n_o$ and $n_e$ of the same for an ordinary ray and an extraordinary ray are 2.4553 and 2.7120 respectively at 1480 nm.

Therefore, the crystal length L is about 8 mm from Equation 3. On the contrary, according to FIG. 6 in which no optical path converting member 12 is used, the separation width D must be 4 mm or more when the diameter of the lenses for collimation is 4 mm. Thus, the crystal length L is about 40 mm from Equation 3 even if a rutile crystal is used. Therefore, in an optical multiplexing/demultiplexing module in one embodiment, the size of the uniaxial birefringent crystal 10 can be reduced to about ⅕ of that in FIG. 6. It is therefore possible to provide a compact and inexpensive optical multiplexing/demultiplexing module.

Let us assume that ψ represents an angle defined by the entrance surface 44 and the first reflecting surface 48 of the optical path converting member 12 and that $n_p$ represents the refractive index of the prism where the optical path converting member 12 is a prism having a parallelogrammatic configuration as described above. Then, the values of ψ and $n_p$ preferably satisfy Equation 5 shown below.

$$90° > \psi > \sin^{-1}(1/n_p) \qquad \text{Equation 5}$$

The angle ψ defined by the entrance surface 44 and the first reflecting surface 48 of the optical path converting member 12 is a crossing angle at which the surfaces 44 and 48 cross each other or a crossing angle at which extensions of those surfaces cross each other.

If Equation 5 is satisfied, when a beam perpendicularly enters the entrance surface 44 of the optical path converting member 12, the beam is subjected to total reflection on the first reflecting surface 48 and the second reflecting surface 50. This makes it possible to suppress optical losses in the optical path converting member 12.

Referring to FIG. 3, BK7 which is one type of glass material is used as the material of the optical path converting member 12, and the refractive index $n_p$ is about 1.5 for a wavelength of 1480 nm. Equation 5 is satisfied because ψ=45°. At this time, when a beam enters the entrance surface 44 of the optical path converting member 12 in a direction perpendicular thereto, the beam is subjected to total reflection on the first and second reflecting surfaces 48 and 50. Therefore, a resultant beam exiting the optical path converting member 12 can be caused to enter the uniaxial birefringent crystal 10 with substantially no loss in comparison to the incident beam.

While a prism having a parallelogrammatic sectional configuration is used as the optical path converting member 12, this is not limiting the invention, and a prism having a triangular configuration or a reflecting mirror or the like may be used, for example. In such cases, however, a beam entering the optical path converting member 12 and an optical axis along which a resultant exiting beam is propagated may not be in parallel with each other. If this happens, the optical axis 42 of the second linearly polarized beam 16 which is a beam entering the optical path converting member 12 and the optical axis 38 of the propagation of the first linearly polarized beam 14 are not in parallel with each other.

On the contrary, an optical path converting member 12 having a parallelogrammatic sectional configuration is used as the optical path converting member 12 in FIG. 3 and, as a result, the optical axis 42 of the second linearly polarized beam 16 which is a beam entering the optical path converting member 12 and the optical axis 38 of the propagation of the first linearly polarized beam 14 are in parallel with each other. Therefore, the first and second optical waveguides 30 and 32 and the first and second lenses 24 and 26 may be disposed side by side. Especially, when the first and second lenses 24 and 26 are provided side by side in the optical multiplexing/demultiplexing module, the space in the apparatus can be effectively utilized, which consequently makes it possible to reduce the size of the optical multiplexing/demultiplexing module itself.

Polarization-maintaining optical fibers are used as the first and second optical waveguides 30 and 32 as described above, and the first and second linearly polarized beams 14 and 16 incident upon the first and second optical waveguides 30 and 32 respectively from a light source are transmitted with their planes of polarization maintained. As a result, when first and second linearly polarized beams 14 and 16 having planes of polarization are orthogonal to each other enter the first and second optical waveguides 30 and 32 respectively, the planes of polarization of the first and second linearly polarized beams 14 and 16 are orthogonal to each other also when they exit. This makes it possible to perform multiplexing and demultiplexing easily.

Figure 4:
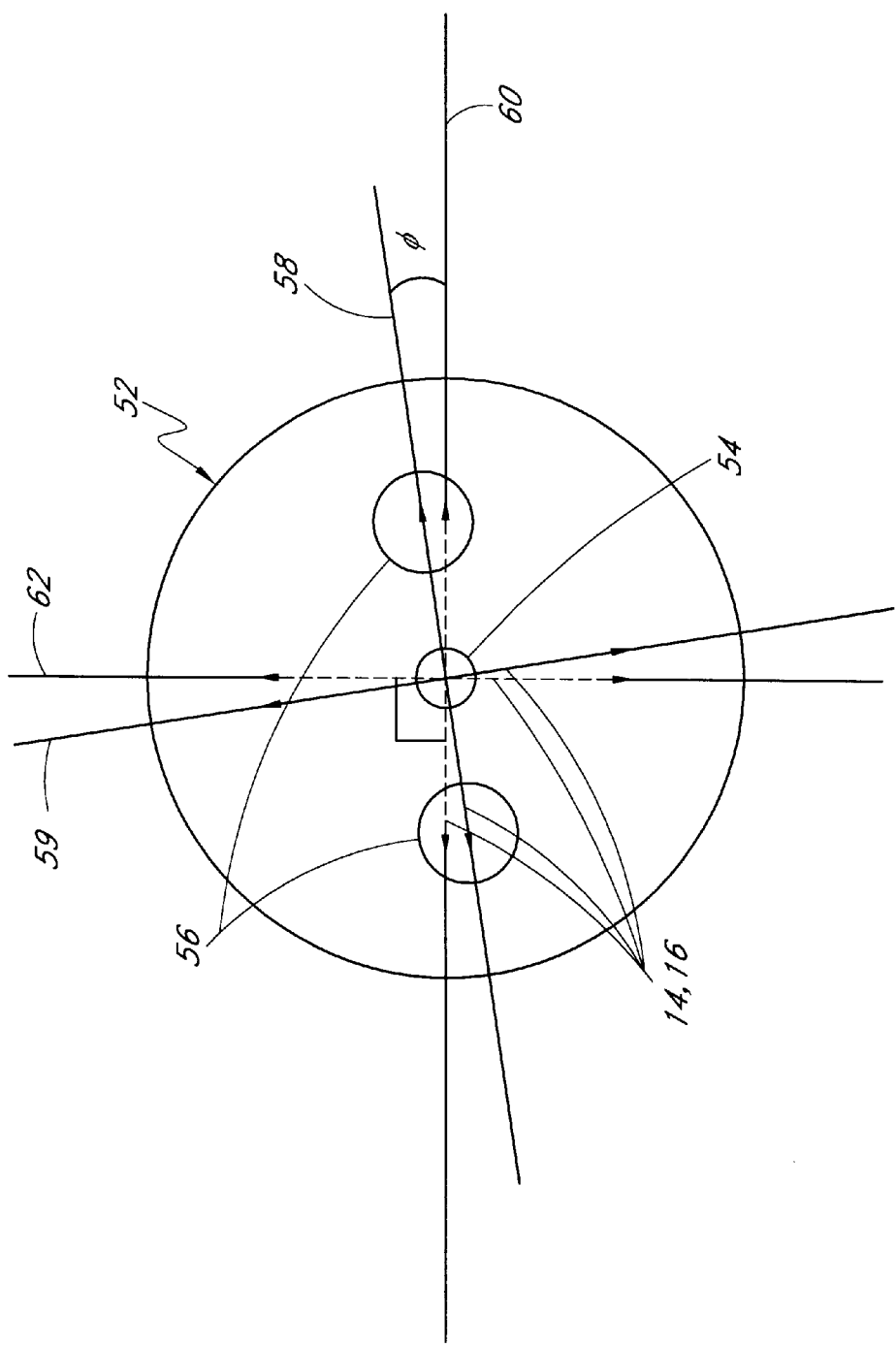
FIG. 4 is a schematic view of a PANDA fiber showing a section thereof taken in a direction orthogonal to the optical axis thereon.

For example, bow tie fibers, elliptic jacket fibers, PANDA fibers, and so on may be used as the polarization-maintaining optical fibers. A description will now be made with reference to FIG. 4 on a case in which PANDA fibers are used as the polarization-maintaining optical fibers. FIG. 4 is a schematic view showing a transverse sectional view of a PANDA fiber taken in a plane orthogonal to the axis thereof.

As shown in FIG. 4, a core 54 for propagating light is provided in the center of a section of a PANDA fiber 52. That is, the core 54 is provided in the vicinity of the axis of the PANDA fiber 52, and stress applying sections 56 are provided on both sides of the core 54. The stress applying sections 56 extend in the axial direction of the PANDA fiber 52 along the core 54. For example, a PANDA fiber 52 having a diameter in the range from about 120 to 130 μm may be used.

When linearly polarized beams enter which have planes of polarization in the directions of two lines 58 and 59 that symmetrically divide regions of the two stress applying sections 56 appearing on the section shown in FIG. 4 into two parts (hereinafter also referred to as "polarization-maintaining lines"), the PANDA fiber can transmit the incident linearly polarized beams with the planes of polarization maintained even under disturbances. The disturbances include stress and the like which cause changes in a state of polarization such as changes in a plane of polarization in a normal optical fiber. For example, the definition applies to bending of an optical fiber.

In the example of a configuration shown in FIG. 4, since the two stress applying sections 56 are circular, the polarization-maintaining lines are a line 58 which connects the centers of the circles of the two stress applying sections 56 and a line 59 which is perpendicular to the line 58. In the case of a polarization-maintaining optical fiber whose stress applying sections 56 are not circular, the polarization-maintaining lines are a line which connects the centers of gravity of the two stress applying sections and a line which is perpendicular to the line. A bow tie fiber is an example of a polarization-maintaining optical fiber whose stress applying sections 56 are not circular. In some polarization-maintaining optical fibers, the stress applying sections are regarded as a single region. An elliptic jacket fiber is an example of such fibers. In this case, lines which symmetrically divide the region to serve as stress applying sections into two parts may be regarded as the polarization-maintaining lines.

Let us assume that the PANDA fiber 52 in FIG. 4 serves as the first optical waveguide 30. Then, when the first linearly polarized beam 14 has a plane of polarization in the direction of the polarization-maintaining line 58 or polarization-maintaining line 59 as indicated by the arrows in solid lines in FIG. 4, the first optical waveguide 30 allows the beam from the light source to be transmitted and to exit with the plane of polarization maintained. Let us similarly assume that the PANDA fiber 52 serves as the second optical waveguide 32. Then, when the second linearly polarized beam 16 has a plane of polarization in the direction of the polarization-maintaining line 58 or polarization-maintaining line 59 as indicated by the arrows in solid lines in FIG. 4, the second optical waveguide 32 allows the beam from the light source to be transmitted and to exit with the plane of polarization maintained. This makes it possible to reduce optical losses in the optical multiplexing/demultiplexing module as a whole.

A case in which the plane of polarization of the first linearly polarized beam 14 and the polarization-maintaining lines 58 and 59 of the PANDA fiber 52 that constitutes the first optical waveguide 30 are shifted from parallelism or perpendicularity. In this case, parallelism or perpendicularity is still maintained between the polarization-maintaining lines 58 and 59 of the PANDA fiber 52 and the plane A. As previously described, the plane A is a plane which includes the optical axes 38 and 40 of the first and second linearly polarized beams 14 and 16 and the crystal axis 36 of the uniaxial birefringent crystal 10. At this time, there is parallelism or perpendicularity between the polarization-maintaining lines 58 and 59 of the PANDA fiber 52 and a plane of polarization which acts as an ordinary ray or extraordinary ray in the uniaxial birefringent crystal 10.

For example, let us assume that the first linearly polarized beam 14 has a plane of polarization in the direction of a line 60 or 62 as indicated by the arrows in dotted line in FIG. 4. The polarization-maintaining line 58 and the line 60 define an angle $\phi$, the polarization-maintaining line 58 and the line 62 define an angle of ($90°-\phi$). The angle $\phi$ has a value which satisfies $-45°\leq\phi\leq45°$. When the first linearly polarized beam 14 has a plane of polarization in the direction of the line 60, the plane of polarization and the polarization-maintaining line 58 are shifted from parallelism by the angle $\phi$. At this time, a section of the plane A is located on the line 58 (the plane A is a plane which extends in a direction perpendicular to the plane of the drawings along the line 58). When the first linearly polarized beam 14 has a plane of polarization in the direction of the line 62, the plane of polarization and the polarization-maintaining line 59 are shifted from perpendicularity by the angle $\phi$. At this time, a section of the plane A is located on the line 59.

In either of the above cases, let us assume that $I_{in}$ represents the intensity (power) of the first linearly polarized beam 14 entering the first optical waveguide 30 or the PANDA fiber 52, and $I_{out}$ represents the intensity (power) of each of components originating from the first linearly polarized beam 14 in the multiplexed beam 20 entering the third optical waveguide 34. Then, the intensity $I_{in}$ and $I_{out}$ and the angle $\phi$ satisfy Equation 6 shown below.

$$I_{out}/I_{in}=100\cdot\cos^2\phi(\%) \qquad \text{Equation 6}$$

Therefore, when the magnitude of the angle $\phi$ is $\pm5°$, $I_{out}/I_{in}=100\cdot\cos^2 5$ or approximately 99.2% from Equation 6.

This indicates that if the magnitude of the angle $\phi$ is $\pm5°$ or less, optical power that is effectively used in the form of the multiplexed beam 20 obtained by multiplexing the first linearly polarized beam 14 and second linearly polarized beam 16 can be kept at 99.2% of the power of the beams entering the optical multiplexing/demultiplexing module. That is, if the magnitude of the angle $\phi$ is $\pm5°$ or less, an optical loss attributable to any shift of the plane of polarization of the first linearly polarized beam 14 and the polarization-maintaining line 58 of the PANDA fiber 52 can be kept at 1% or less, which makes it possible to fabricate an optical multiplexing/demultiplexing module having small practical optical losses.

An optical loss attributable to any shift of the plane of polarization of the first linearly polarized beam 14 and the polarization-maintaining line 58 of the PANDA fiber 52 occurs for the following reason. When the first linearly polarized beam 14 having intensity $I_{in}$ has a plane of polarization in the direction of the line 60, the first linearly polarized beam 14 exits from the first optical waveguide 30 in a state in which it is separated into components in the directions of the lines 58 and 59.

While a major part of the exiting beam exits as a linearly polarized beam having a plane of polarization in the direction of the line 58, a part of the same exits as a linearly polarized beam having a plane of polarization in the direction of the line 59. The former linearly polarized beam is propagated as an ordinary ray after entering the uniaxial birefringent crystal 10 and is effectively utilized as a multiplexed beam. However, the latter linearly polarized beam is propagated as an extraordinary ray in a path different from that of the former linearly polarized beam after entering the uniaxial birefringent crystal 10 and, therefore, the same beam can not be extracted as a multiplexed beam 20. As a result, an optical loss corresponding to the latter linearly polarized beam occurs. Optical losses considered here are limited to losses attributable to any shift of the angle $\phi$.

The same is true when the first linearly polarized beam 14 has a plane of polarization in the direction of the line 62. While the above description has referred to the first linearly polarized beam 14 and the first optical waveguide 30, the same is true for the second linearly polarized beam 16 and the second optical waveguide 32.

While the above description has referred to a case wherein the plane of polarization of the first linearly polarized beam 14 and the polarization-maintaining line 58 are shifted from parallelism or perpendicularity, an optical loss occurs also when the polarization-maintaining line of the first optical waveguide 30 and the plane A are shifted from parallelism or perpendicularity. In this case, the plane of polarization of the first linearly polarized beam 14 and the polarization-maintaining line 58 of the first optical waveguide 30 are described as being in parallel with or perpendicular to each other.

For example, let us assume that a section of the plane A is located on the line 60 or line 62 shown in FIG. 4. When the section of the plane A is located on the line 60, the plane A is shifted from the polarization-maintaining line 58 by the angle $\phi$. At this time, it is assumed that the first linearly polarized beam 14 has a plane of polarization in the direction of the line 58. When the section of the plane A is located on the line 62, the plane A is shifted from the polarization-maintaining line 59 by the angle $\phi$. At this time, it is assumed that the first linearly polarized beam 14 has a plane of polarization in the direction of the line 59.

In either of the above cases, let us assume that $I_{in}$ represents the intensity (power) of the first linearly polarized beam 14 entering the first optical waveguide 30 or the PANDA fiber 52, and $I_{out}$ represents the intensity (power) of each of components originating from the first linearly polarized beam 14 in the multiplexed beam 20 entering the third optical waveguide 34. Then, the intensity $I_{in}$ and $I_{out}$ and the angle $\phi$ satisfy Equation 6.

Therefore, when the magnitude of the angle $\phi$ is $\pm5°$, $I_{out}/I_{in}=100\cdot\cos^2 5$ or approximately 99.2% from Equation 6.

This indicates that if the magnitude of the angle $\phi$ is $\pm5°$ or less, optical power that is effectively used in the form of the multiplexed beam 20 obtained by multiplexing the first linearly polarized beam 14 and second linearly polarized beam 16 can be kept at 99.2% of the power of the beams entering the optical multiplexing/demultiplexing module. That is, if the magnitude of the angle $\phi$ is $\pm5°$ or less, an optical loss attributable to any shift of the polarization-maintaining line and the plane A can be kept at 1% or less, which makes it possible to fabricate an optical multiplexing/demultiplexing module having low practical optical losses.

An optical loss attributable to any shift of the polarization-maintaining line and the plane A occurs for the following reason. When the first linearly polarized beam 14 having intensity $I_{in}$ has a plane of polarization in the direction of the line 58, the first linearly polarized beam 14 exits from the first optical waveguide 30 with the plane of polarization maintained in the direction of the line. 58. However, when the linearly polarized beam which has exited the first optical waveguide 30 and which has a plane of polarization in the direction of the line 58 enters the uniaxial birefringent crystal 10, it is propagated in a state in which it is separated into components in the directions of the lines 60 and 62.

The former linearly polarized beam is propagated as an ordinary ray after entering the uniaxial birefringent crystal 10 and is effectively utilized as a multiplexed beam. However, the latter linearly polarized beam is propagated as an extraordinary ray in a path different from that of the former linearly polarized beam after entering the uniaxial birefringent crystal 10 and, therefore, the same beam can not be extracted as a multiplexed beam 20. As a result, an optical loss corresponding to the latter linearly polarized beam occurs. Optical losses considered here are limited to losses attributable to any shift of the angle φ.

The same is true when the first linearly polarized beam 14 has a plane of polarization in the direction of the line 59. While the above description has referred to the first linearly polarized beam 14 and the first optical waveguide 30, the same is true for the second linearly polarized beam 16 and the second optical waveguide 32.

The third optical waveguide 34 is constituted by a single mode optical fiber or a polarization-maintaining fiber depending on requirements. That is, if there is no concern about the direction of a plane of polarization when a multiplexed beam 20 is utilized in another apparatus, either of a single mode optical fiber and a polarization-maintaining optical fiber may be used as the third optical waveguide 34. However, when a plane of polarization must be maintained, a polarization-maintaining optical fiber may be used.

Further, a anti-reflection coating and a wavelength selection coating are provided on the entrance surface 18 and exit surface 22 of the uniaxial birefringent crystal 10. A anti-reflection coating and a wavelength selection coating are also provided on the entrance surface 44 and exit surface 46 of the optical path converting member 12. Similarly, a anti-reflection coating and a wavelength selection coating are provided on the entrance surfaces and exit surfaces of the first, second, and third lenses 24, 26, and 28. Similarly, a anti-reflection coating and a wavelength selection coating are provided on the exit surfaces of the first and second optical waveguides 30 and 32 and the entrance surface of the third optical waveguide 34. A wavelength selection coating is a coating which allows only a wavelength of interest to pass. No wavelength selection coating is required when the first and second linearly polarized beams 14 and 16 have only one wavelength which is the wavelength of interest. However, a wavelength selection coating will be effective if the first and second linearly polarized beams 14 and 16 includes beams having other wavelength which can be noises.

The exit surfaces of the first and second optical waveguides 30 and 32 and the entrance surface of the third optical waveguide 34 are obliquely cut to maintain a return loss of 35 dB or more.

It is not essential to provide the reflection preventing films and to cut interfaces of the optical waveguides in the optical multiplexing/demultiplexing module according to the invention. However, it is preferable to provide those features because reflection of a beam having a wavelength of interest can be suppressed at the entrance surface or exit surface of each component to increase the return loss. It is therefore preferable to dispose reflection preventing films as described above and to adopt a configuration in which interfaces of the optical waveguides are diagonally cut in order to suppress optical losses and to provide an optical multiplexing/demultiplexing module with small losses.

For the above-described optical multiplexing/demultiplexing module, it is not essential that the first linearly polarized beam 14 and second linearly polarized beam 16 have the same optical intensity and wavelength and, they may be different.

Figure 5:
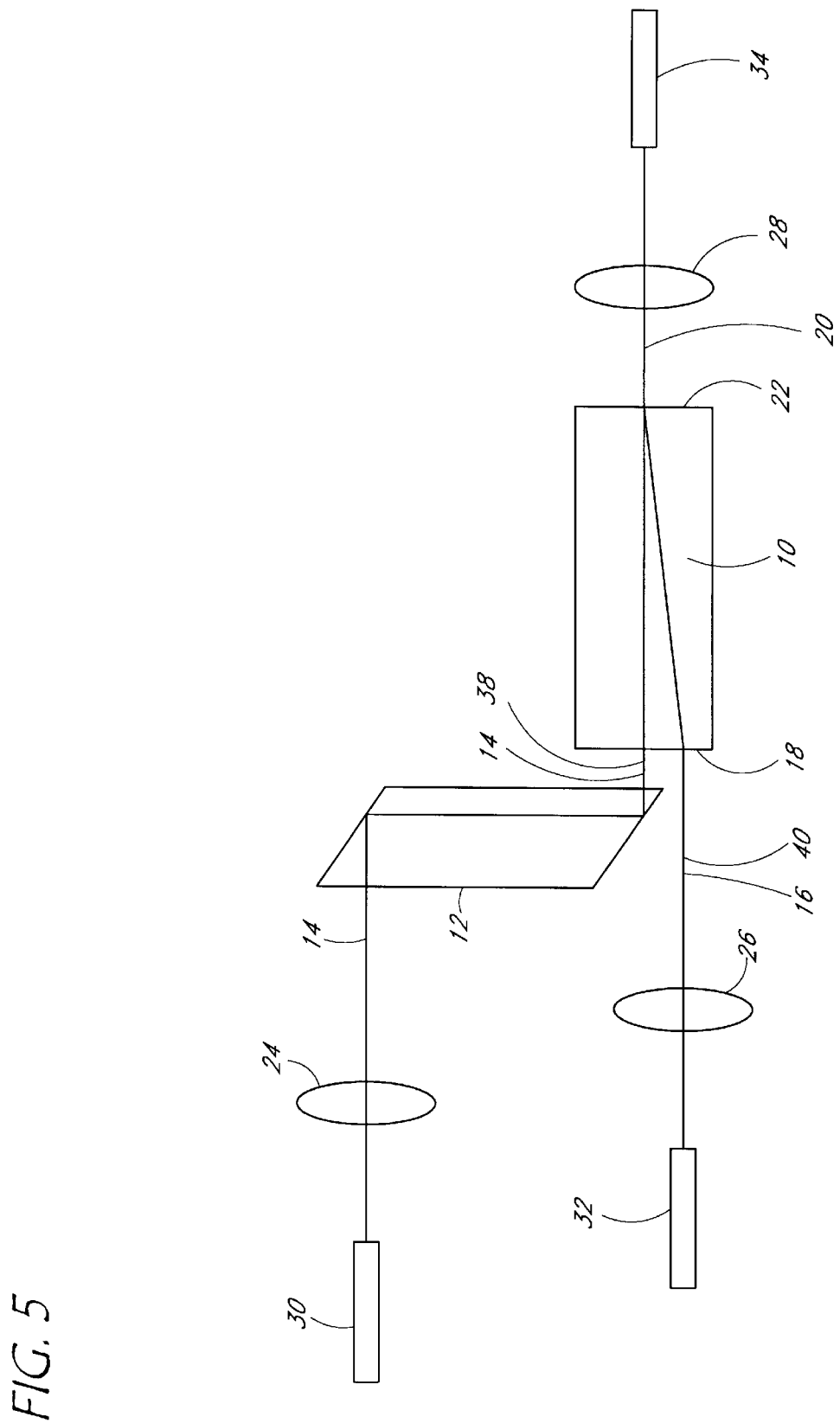
FIG. 5 is a schematic view of one embodiment of an optical multiplexing/demultiplexing module according to the invention.

The invention is not limited to the above-described embodiment and may be carried out in various modes. FIG. 5 is a schematic configuration diagram of an optical multiplexing/demultiplexing module according to another embodiment.

The embodiment shown in FIG. 1 has a structure in which the optical path converting member 12 is provided in the optical path in which the second linearly polarized beam 16 is propagated. Further, the plane of polarization of the first linearly polarized beam 14 is in orthogonal with the plane A, and the plane of polarization of the second linearly polarized beam 16 is parallel to the plane A.

On the contrary, the optical multiplexing/demultiplexing module shown in FIG. 5 has a structure in which the optical path converting member 12 is provided in the optical path in which the first linearly polarized beam 14 is propagated. The configuration is the same as that in FIG. 1 except that the optical path converting member 12 is provided in the optical path in which the first linearly polarized beam 14 is propagated, and the description will therefore omit identical features. The planes of polarization of the first and second linearly polarized beams 14 and 16 are the same as those in the configuration in FIG. 1.

The optical multiplexing/demultiplexing module shown in FIG. 5 performs optical path conversion by causing a parallel shift of the optical path of the first linearly polarized beam 14 with the optical path converting member 12. The first linearly polarized beam 14 in the example shown in FIG. 5 also acts as an ordinary ray after entering the uniaxial birefringent crystal 10.

In the optical multiplexing/demultiplexing module having the configuration shown in FIG. 5, the separation width D can be made small like the embodiment shown in FIG. 1. Therefore, the uniaxial birefringent crystal 10 can be made compact to allow the optical multiplexing/demultiplexing module itself to be fabricated at a low cost like the configuration in FIG. 1.

The following configuration may be used as another embodiment of an optical multiplexing/demultiplexing module according to the invention. Specifically, an alternative configuration may be achieved by switching the planes of polarization of the first and second linearly polarized beams 14 and 16 in the configuration shown in FIG. 2 to invert the crystal axis 36 of the uniaxial birefringent crystal 10 in the plane A relative to the line a shown in FIG. 2. This configuration is technically equivalent to the embodiment shown in FIG. 5, although not shown.

Further, an optical path converting member 12 may be provided in each of the optical path of the first linearly polarized beam 14 and the optical path of the second linearly polarized beam 16. In this case, the optical path converting member 12 provided in the optical path of the first linearly polarized beam 14 performs optical path conversion, for example, by causing a parallel shift of the optical path of the first linearly polarized beam 14, and the optical path converting member 12 provided in the optical path of the second linearly polarized beam 16 performs optical path conversion, for example, by causing a parallel shift of the optical path of the second linearly polarized beam 6. Advantages similar to those of the above-described embodiment are achieved by reducing the separation width D as a result of such shifts.

Since the optical multiplexing/demultiplexing module in each of the above-described embodiments can be used as an optical multiplexer, for example, the optical multiplexing/demultiplexing module in each of the embodiments can be advantageously used as a component of a light source for exciting an EDFA used as an optical amplifier.

Specifically, when linearly polarized beams oscillated by two semiconductor lasers are multiplexed using an optical multiplexing/demultiplexing module based on the linearly polarized beam multiplexing/demultiplexing method, the optical power of the laser beams can be increased without increasing the power of the semiconductor lasers themselves. For example, power of 200 nW can be theoretically expected when two laser beams of 100 mW are multiplexed. For example, a laser beam with high power thus obtained can be used as a light source for exciting an EDFA.

When the optical multiplexing/demultiplexing module in each of the above embodiments is used in a light source for exciting an EDFA, the first and second linearly polarized beams 14 and 16 are semiconductor laser beams of, for example, 0.98 $\mu$m and 1.48 $\mu$m which are wavelengths for exciting an EDFA. Those semiconductor laser beams enter the first and second polarization-maintaining optical fibers 30 and 32 through the first and second optical input sections 1 and 2. Then, the optical multiplexing/demultiplexing module multiplexes the input semiconductor laser beams into a multiplexed beam 20 which exits. In doing so, since there is no need for maintaining the plane of polarization of the multiplexed beam 20 from the optical multiplexing/demultiplexing module, either of a single mode optical fiber and a polarization-maintaining optical fiber may be used as the third optical waveguide 34.

An optical multiplexing/demultiplexing module according to the invention has not only the multiplexing function but also the demultiplexing function. Therefore, an optical multiplexing/demultiplexing module can be used as an optical demultiplexer by reversing the direction in which light is propagated with the configuration of the optical multiplexing/demultiplexing module kept unchanged. Referring to FIG. 1, for example, a circularly polarized beam or a linearly polarized beam from a light source may be transmitted in and emitted from the third optical waveguide 34, and it may be demultiplexed by the uniaxial birefringent crystal 10 and may enter the first and second optical waveguides 30 and 32 to be transmitted thereby.

At this time, the beam which has exited the third optical waveguide 34 enter the first and second optical waveguides 30 and 32 after being demultiplexed with substantially no optical loss. Therefore, it seems that either of a polarization-maintaining optical fiber and a single mode optical fiber may be used as the third optical waveguide 34. However, it is desirable to use a polarization-maintaining optical fiber, because the use of a single mode optical fiber is impractical because of its inability of defining the state of polarization of an incident beam.

A description will now be made with reference to FIGS. 7 and 8 on a comparative example of an optical multiplexing/demultiplexing module based on the linearly polarized beam multiplexing/demultiplexing method. In the optical multiplexing/demultiplexing module shown in FIG. 7, linearly polarized beams having planes of polarization orthogonal to each other are multiplexed using a polarization beam splitter 92. The polarization beam splitter 92 has prisms 91 and 93 made of glass having a triangular section, and dielectric multi-layer films provided on an interface 94 between them are bonded together.

The polarization beam splitter 92 transmits a first linearly polarized beam 87 which has exited a first polarization-maintaining optical fiber 84, reflects a second linearly polarized beam 89 which has exited a second polarization-maintaining optical fiber 88, and multiplexes the first and second linearly polarized beams 87 and 89.

Figure 8:
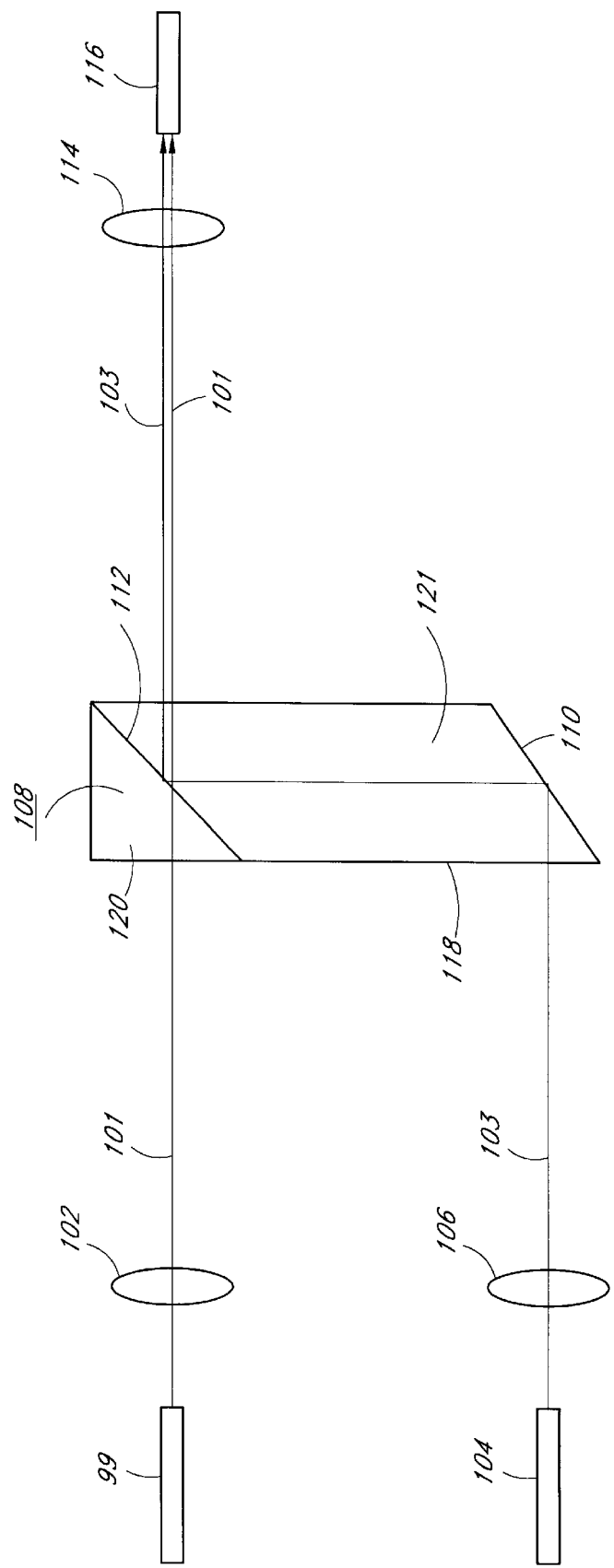
FIG. 8 is a schematic view of another comparative example of an optical multiplexing/demultiplexing module.

In the optical multiplexing/demultiplexing module shown in FIG. 8, linearly polarized beams having planes of polarization orthogonal to each other are multiplexed using a polarization beam splitter 108. The polarization beam splitter 108 is formed by bonding a prism 120 having a triangular section, a prism 121 having a parallelogrammatic section, and dielectric multi-layer films provided on an interface 112 between them.

The polarization beam splitter 108 transmits a first linearly polarized beam 101 which has exited a first polarization-maintaining optical fiber 99, reflects a second linearly polarized beam 103 which has exited a second polarization-maintaining optical fiber 104, and multiplexes the first and second linearly polarized beams 101 and 103.

Figure 7:
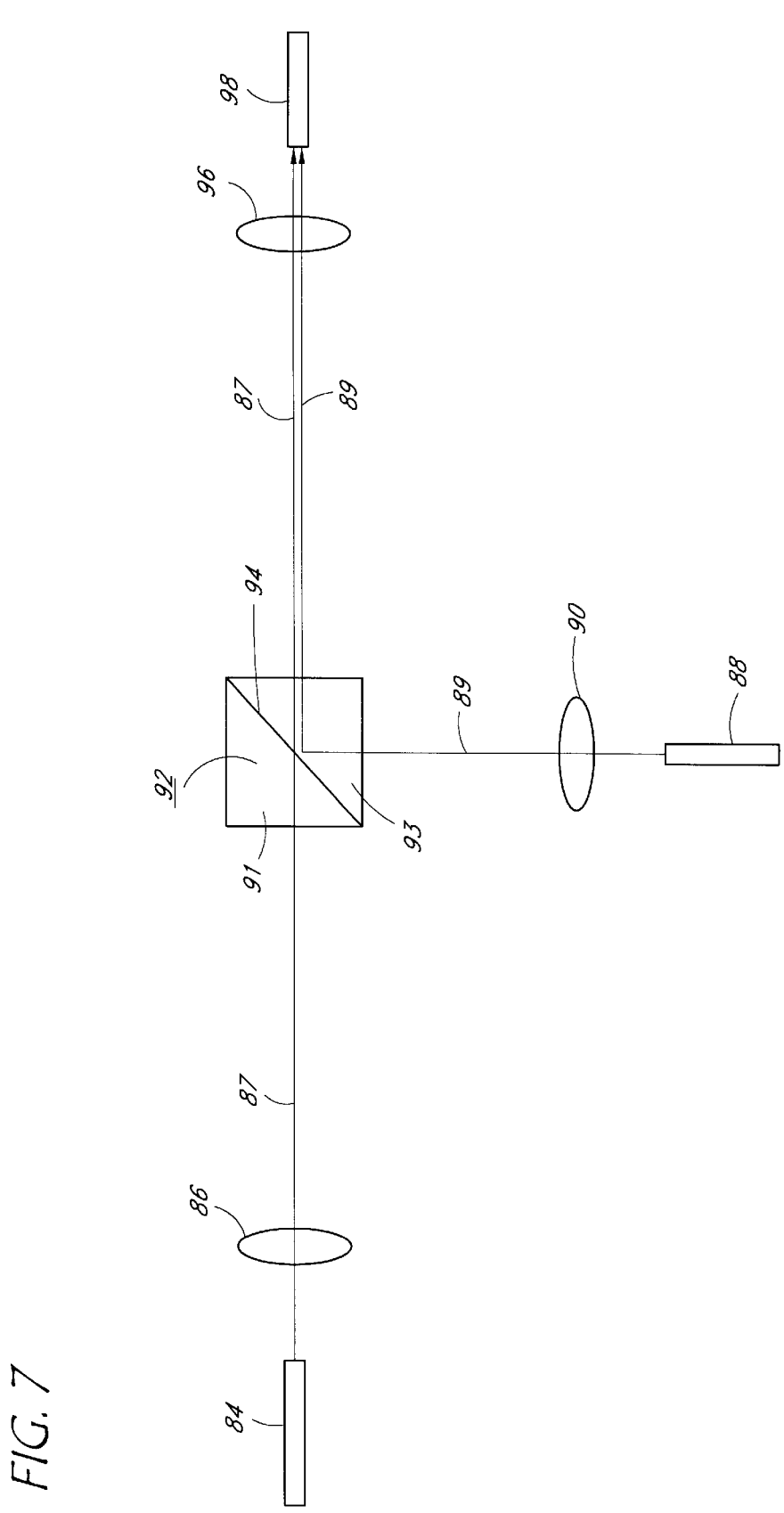
FIG. 7 is a schematic view of a comparative example of an optical multiplexing/demultiplexing module

In FIGS. 7 and 8, reference numbers 86, 90, 102, and 106 represent lenses for converting a linearly polarized beam into a parallel beam; reference numbers 96 and 114 represent converging lenses; and reference numbers 98 and 116 represent optical fibers for propagating a multiplexed beam.

As shown in those comparative examples, in an optical multiplexing/demultiplexing module utilizing a polarization beam splitter, prisms and dielectric multi-layer films are bonded together using an organic adhesive such as epoxy. The organic adhesive is deteriorated when linearly polarized beams with high power enter the polarization beam splitters 92 and 108. Further, since the organic adhesive expands as a result of a temperature change. In the comparative examples, therefore, reliability of multiplexing and demultiplexing can be reduced for the following three reasons.

First, deterioration of the adhesive can result in changes in the reflectivity and transmittivity at the interfaces 94 and 112 to increase optical losses. Second, deterioration of the adhesive can reduce the adhesive strength of the adhesive, which may cause the prisms that have been fixed to move at the interfaces 94 and 112. Third, the prisms can move at the interfaces 94 and 112 when the adhesive undergoes thermal expansion as a result of a temperature change caused by some reason such as heating of the optical multiplexing/demultiplexing modules themselves during the use of them.

The optical multiplexing/demultiplexing module according to the invention shown in FIG. 3 is free from problems associated with deterioration and thermal expansion of an adhesive as described above because no polarization beam splitter is used.

Figure 6:
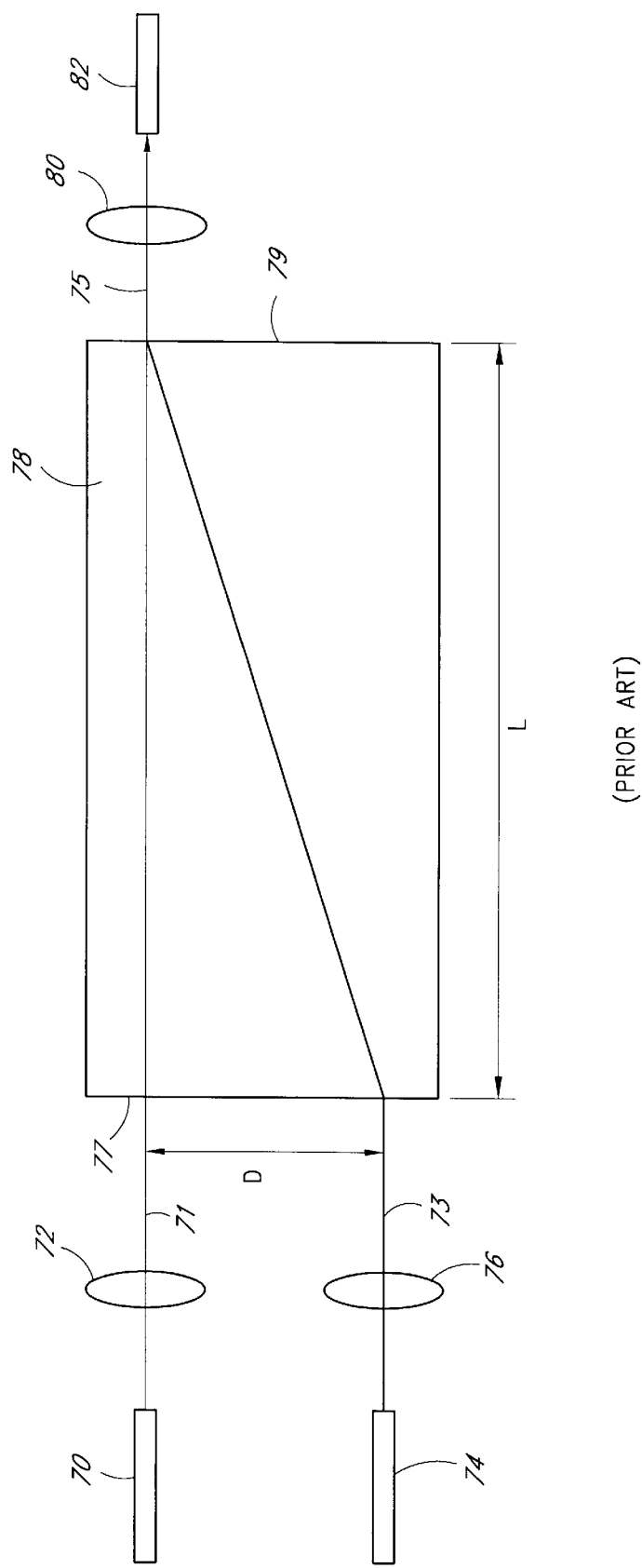
FIG. 6 is a schematic view of an example of a configuration of an optical multiplexing/demultiplexing module according to the prior art.

In the optical multiplexing/demultiplexing module utilizing a uniaxial birefringent crystal as shown in FIG. 6, the crystal length L of the uniaxial birefringent crystal 78 is determined in accordance with the distance between the optical axis of the first linearly polarized beam 71 and the optical axis of the second linearly polarized beam 73 on the entrance surface 77 of the uniaxial birefringent crystal 78 (D in FIG. 6). That is, the crystal length L increases with the distance (separation width) D.

However, the distance between the first polarization-maintaining optical fiber 70 and the second polarization-maintaining optical fiber 74 must be at least as large as the diameter of the first and second lenses 72 and 76. The first linearly polarized beam 71 and second linearly polarized beam 73 respectively exiting the first polarization-maintaining optical fiber 70 and second polarization-maintaining optical fiber 74 are normally propagated in parallel with each other up to the entrance surface 77 of the uniaxial birefringent crystal 78. Thus, the distance between the points of entrance of the first and second linearly polarized beams 71 and 73 entering the entrance surface 77 (separation width D) is also as large as the diameter of the first and second lenses 72 and 76. It is therefore difficult to reduce the distance D in an optical multiplexing/demultiplexing module utilizing a conventional uniaxial birefringent crystal 78 as shown in FIG. 6, which has made such an optical multiplexing/demultiplexing module large.

For example, if the diameter of the first and second lenses 72 and 76 is 5 mmφ, the separation width D must be at least about 5 mm. When the separation width D is about 5 mm, the crystal length L of the uniaxial birefringent crystal 78 must be about 50 mm, which results in a need for a large uniaxial birefringent crystal 78. As a result, the size of the optical multiplexing/demultiplexing module as a whole is increased, which is accompanied by an increase in the manufacturing cost of the apparatus.

On the contrary, according to one embodiment of the invention shown in FIG. 1, since the separation width D between the first and second linearly polarized beams entering the uniaxial birefringent crystal can be made small, increases in the size and manufacturing cost of the apparatus can be suppressed.

In summary, the present invention provides an optical multiplexing/demultiplexing module having a high performance which can be fabricated with a small size and at a low cost, which is stable against changes in the environment such as temperature changes, and which can accommodate incident beams having high power with reduced optical losses.

What is claimed is:

1. An optical multiplexing/demultiplexing module comprising:
   a first optical input section for inputting a first linearly polarized beam;
   a second optical input section provided at an interval d from the first optical input section for inputting a second linearly polarized beam having a plane of polarization orthogonal to that of the first beam;
   a uniaxial birefringent crystal for multiplexing the first and second beams;
   an optical output section for outputting a multiplexed beam multiplexed by the crystal;
   an optical path converting member for converting at least one of an optical path of the first beam or the second beam and for causing the first or the second beam to enter the crystal;
   wherein the converting member is arranged for performing the optical path conversion such that a distance D between the respective points of entrance of the first and second beams entering an entrance surface of the crystal is smaller than d; and
   wherein D is substantially equal to or greater than a sum of twice a spot size of the first beam on the entrance surface plus twice a spot size of the second beam on the entrance surface.

2. An optical multiplexing/demultiplexing module according to claim 1, wherein said uniaxial birefringent crystal comprises:
   a beam entrance surface and a beam exit surface which are surfaces in parallel with each other, and wherein:
   a crystal axis of the uniaxial birefringent crystal is formed on a plane including the optical axes of the first and second linearly polarized beams which are in parallel with each other; and
   either of the planes of polarization of the first and second linearly polarized beams is orthogonal to the plane and the other is in parallel with the plane.

3. An optical multiplexing/demultiplexing module according to claim 1, wherein said first linearly polarized beam and the second linearly polarized beam substantially perpendicularly enter the entrance surface of the uniaxial birefringent crystal.

4. An optical multiplexing/demultiplexing comprising:
   a first optical input section for inputting a first linearly polarized beam;
   a second optical input section provided at a distance d from the first optical input section for inputting a second linearly polarized beam having a plane of polarization orthogonal to that of the first beam;
   a uniaxial birefringent crystal for multiplexing the first and second beams into a multiplexed beam;
   an optical output section for outputting the multiplexed beam;
   an optical path converting member for converting at least one of an optical path of the first beam or the second beam and for causing the first or the second beam to enter the crystal;
   wherein the first and second beams substantially perpendicularly enter the entrance surface of the crystal;
   wherein the converting member is arranged for performing the optical path conversion such that a distance D between the respective points of entrance of the first and second beams entering an entrance surface of the crystal is smaller than d; and
   wherein D is expressed by $D=L\cdot[\{(n_o^2-n_e^2)\cdot\tan\Theta\}/\{n_e^2+n_o^2\cdot\tan^2\Theta\}]$, wherein L represents the distance between the entrance surface and an exit surface of the crystal, $\Theta$ represents an angle defined by a straight line perpendicular to the entrance surface and the exit surface and the crystal axis of the crystal, and $n_o$ and $n_e$ represent refractive indices of the crystal for an ordinary ray and an extraordinary ray, respectively.

5. An optical multiplexing/demultiplexing module according to claim 4, wherein said angle $\Theta$ is expressed by:

$$\Theta=\tan^{-1}(n_e/n_o).$$

6. An optical multiplexing/demultiplexing module according to claim 1, wherein said optical path converting member is a prism, the prism comprising:
   an entrance surface and an exit surface which are in parallel with each other;
   a first reflecting surface on which a beam incident upon the entrance surface is first reflected; and
   a second reflecting surface which faces the first reflecting surface with a gap between them and which is in parallel with the first reflecting surface, and wherein
   a linearly polarized beam which has entered the optical path converting member enters the entrance surface of the prism and is thereafter reflected by the first reflecting surface; and
   the linearly polarized beam is thereafter reflected by the second reflecting surface to exit from the exit surface.

7. An optical multiplexing/demultiplexing module according to claim 6, wherein a part of the prism that is nearest to the linearly polarized beam which does not enter the prism is apart from the optical axis of the first linearly polarized beam by a distance equal to or greater than twice a spot size of the first linearly polarized beam on the entrance surface of the uniaxial birefringent crystal and is apart from the optical axis of the second linearly polarized beam by a distance equal to or greater than twice a spot size of the second linearly polarized beam on the entrance surface of the uniaxial birefringent crystal.

8. An optical multiplexing/demultiplexing module according to claim 1, wherein an angle $\Psi$ satisfies:

$$90°>\Psi>\sin^{-1}(1/n_p)$$

where the angle $\Psi$ is an angle defined by the entrance surface and a reflecting surface of the crystal, and $n_p$ represents a refractive index of the crystal.

9. An optical multiplexing/demultiplexing module according to claim 1, comprising:
   a first lens for converting the first linearly polarized beam propagating from the first optical input section into a parallel beam;
   a second lens for converting the second linearly polarized beam propagating from the second optical input section into a parallel beam; and
   a third lens for converging a multiplexed beam obtained by multiplexing the first linearly polarized beam and the second linearly polarized beam at the uniaxial birefringent crystal.

10. An optical multiplexing/demultiplexing module according to claim 1, comprising:
   a first optical waveguide for transmitting and outputting the first linearly polarized beam input through the first optical input section;
   a second optical waveguide for transmitting and outputting the second linearly polarized beam input through the second optical input section; and
   a third optical waveguide for receiving and transmitting a multiplexed beam obtained by multiplexing the first linearly polarized beam and the second linearly polarized beam at the uniaxial birefringent crystal.

11. An optical multiplexing/demultiplexing module according to claim 1, wherein said uniaxial birefringent crystal is formed from any of rutile, calcite, lithium niobate, lithium tantalate, YVO$_4$, quartz, LiB$_3$O$_5$ and BaB$_2$O$_4$.

12. An optical multiplexing/demultiplexing module according to claim 1, wherein at least either of an anti-reflection coating and a wavelength selection coating is provided at least in regions of the entrance surface and exit surface of said uniaxial birefringent crystal where a beam passes through.

13. An optical multiplexing/demultiplexing module according to claim 6, wherein at least either of a reflection preventing film and a wavelength selection coating is provided at least in regions of the entrance surface and exit surface of said optical path converting member where a beam passes through.

14. An optical multiplexing/demultiplexing module according to claim 9, wherein said first, second, and third lenses are each selected from the group consisting of a ball lens, a graded index (GRIN) lens, an aspherical lens and a multi-mode graded fiber lens (MMFL) and wherein at least either of a reflection preventing film and a wavelength selection coating is provided at least in interface regions of said first, second, and third lenses where a beam passes through.

15. An optical multiplexing/demultiplexing module according to claim 10, wherein said first optical waveguide and second optical waveguide are polarization-maintaining optical fibers and wherein said third optical waveguide is a single mode fiber or polarization-maintaining optical fiber.

16. An optical multiplexing/demultiplexing module according to claim 15, wherein polarization-maintaining lines of the polarization-maintaining optical fibers are in a parallel or orthogonal positional relationship with a plane including the optical axes of the first and second linearly polarized beams and the crystal axis of the uniaxial birefringent crystal or at an angular shift of 5° or less from the same.

17. An optical multiplexing/demultiplexing module comprising:
   a first optical input section for inputting a first linearly polarized beam;
   a second optical input section provided at an interval d from the first optical input section for inputting a second linearly polarized beam having a plane of polarization orthogonal to that of the first beam;
   a uniaxial birefringent crystal for multiplexing the first and second beams;
   an optical output section for outputting a multiplexed beam multiplexed by the crystal;
   an optical path converting member for converting at least one of an optical path of the first beam or the second beam and for causing the first or the second beam to enter the crystal;
   wherein the converting member is arranged for performing the optical path conversion such that a distance D between the respective points of entrance of the first and second beams entering an entrance surface of the crystal is smaller than d;
   a first optical waveguide for transmitting and outputting the first beam input through the first optical input section;
   a second optical waveguide for transmitting and outputting the second beam input through the second optical input section;
   a third optical waveguide for receiving and transmitting the multiplexed beam; and
   wherein end faces of cores of said first, second, and third optical waveguides are obliquely cut at an angle at which a return loss of 35 dB or more is maintained.

18. An optical multiplexing/demultiplexing module according to claim 10, wherein at least either of an anti-reflection coating and a wavelength selection coating is provided at least in interface regions of said first, second, and third optical waveguides where a beam passes through.

* * * * *